United States Patent
Wallner et al.

(10) Patent No.: US 9,614,420 B2
(45) Date of Patent: Apr. 4, 2017

(54) REDUNDANT BRUSHLESS DRIVE SYSTEM

(71) Applicant: Dr. Fritz Faulhaber GmbH & Co. KG, Schönaich (DE)

(72) Inventors: Herbert Wallner, Schönaich (DE); Sanjay Jadhav, Böblingen (DE)

(73) Assignee: DR. FRITZ FAULHABER GMBH & CO. KG, Schönaich (DE)

( * ) Notice: Subject to any disclaimer, the term of this patent is extended or adjusted under 35 U.S.C. 154(b) by 233 days.

(21) Appl. No.: 14/658,464

(22) Filed: Mar. 16, 2015

(65) Prior Publication Data
US 2015/0263593 A1 Sep. 17, 2015

(30) Foreign Application Priority Data
Mar. 17, 2014 (DE) .................. 10 2014 103 607

(51) Int. Cl.
*H02K 11/00* (2016.01)
*H02K 3/28* (2006.01)
(Continued)

(52) U.S. Cl.
CPC .......... *H02K 11/0021* (2013.01); *H02K 3/04* (2013.01); *H02K 3/28* (2013.01); *H02K 19/10* (2013.01);
(Continued)

(58) Field of Classification Search
CPC ...... H02K 11/0021; H02K 19/10; H02K 3/28; H02K 11/0073; H02K 2213/06; H02K 29/12; H02K 3/04
(Continued)

(56) References Cited

U.S. PATENT DOCUMENTS

| 4,174,484 A | * | 11/1979 | Schmider | ................ G01P 3/481 |
| | | | | 310/268 |
| 4,394,594 A | | 7/1983 | Schmider et al. | |
(Continued)

FOREIGN PATENT DOCUMENTS

| DE | 1 463 855 | 1/1969 |
| DE | 31 40 034 A1 | 5/1982 |
(Continued)

OTHER PUBLICATIONS

PCT International Search Report—Aug. 13, 2014.

*Primary Examiner* — Alex W Mok
(74) *Attorney, Agent, or Firm* — Brinks Gilson & Lione

(57) ABSTRACT

A redundant brushless drive system, including a coil (12) having first and second phase windings operable independently of one another and first and second independently operable sensor groups for the rotational position of a rotor (11) and for commutation of the phase windings. The first and second sensor groups are positioned along the motor axle one-behind-the-other parallel to each other and symmetrical to the motor axle (10). An encoder circuit board (7) is configured such that an association of the sensor groups (G1, G2) to a phase winding (W1, W2) is configurable such that either the first sensor group (G1) is used for controlling the first phase winding (W1) and the second sensor group (G2) for controlling the second phase winding (W2), or the first sensor group (G1) is used for controlling the second phase winding (W2) and the second sensor group (G2) for controlling the first phase winding (W1).

9 Claims, 5 Drawing Sheets

(51) Int. Cl.
  *H02K 19/10* (2006.01)
  *H02K 29/12* (2006.01)
  *H02K 3/04* (2006.01)

(52) U.S. Cl.
  CPC ......... *H02K 29/12* (2013.01); *H02K 2213/06* (2013.01)

(58) Field of Classification Search
  USPC .................................................. 310/71, 68 B
  See application file for complete search history.

(56) References Cited

U.S. PATENT DOCUMENTS

| | | | | |
|---|---|---|---|---|
| 4,629,948 A | * | 12/1986 | Tassinario | G01P 3/487 310/113 |
| 4,875,110 A | * | 10/1989 | Kazama | G11B 5/53 310/268 |
| 5,006,765 A | | 4/1991 | Schmider | |
| 5,200,661 A | * | 4/1993 | Shramo | H02K 3/04 310/156.06 |
| 5,323,075 A | | 6/1994 | Denk et al. | |
| 5,864,192 A | * | 1/1999 | Nagate | H02K 11/01 310/156.05 |
| RE38,601 E | * | 9/2004 | Elsasser | G11B 17/038 360/97.21 |
| 7,221,116 B2 | * | 5/2007 | Nakai | F16H 61/32 318/266 |
| 7,609,012 B2 | * | 10/2009 | Kamio | F16H 61/32 318/266 |
| 7,663,279 B2 | * | 2/2010 | Tsai | H02K 5/1737 310/67 R |
| 2013/0293172 A1 | * | 11/2013 | Jeung | H02K 29/08 318/400.38 |

FOREIGN PATENT DOCUMENTS

| | | |
|---|---|---|
| DE | 3432946 A1 | 3/1986 |
| EP | 0 754 365 B1 | 2/1998 |
| EP | 1 855 372 A1 | 11/2007 |

\* cited by examiner

REDUNDANT BRUSHLESS DRIVE SYSTEM

CROSS-REFERENCE TO RELATED APPLICATIONS

This application claims priority to German Application No. 10 2014 103 607.7, filed Mar. 17, 2014.

FIELD OF THE INVENTION

The invention relates to a redundant brushless drive system, including a coil having a plurality of phase windings operable independently of one another and a sensor system including a plurality of independently operable sensor groups for acquiring the rotational position of a rotor and for commutation of the phase windings.

BACKGROUND OF THE INVENTION

Redundant brushless drive systems are used in particular in applications having heightened failure safety, for example in air travel, and are known in principle.

A redundant electric motor is described in EP 0 754 365 B1. In the electric motor described by this reference the rotor includes two magnetic pole pairs disposed axially one-behind-the-other, wherein the stator in particular is formed from two separated coils correspondingly disposed axially one-behind-the-other, each of which is associated with a magnetic pole pair. The two coils are controllable independently of each other. Such an electric motor has the disadvantage that a relatively large installation space is needed for arrangement of the magnetic pole pairs and the coils.

An embodiment of a redundant brushless direct-current motor is described in DE 31 40 034. The direct current motor includes grooved stator windings. The rotor includes four magnetic pole pairs. The stator windings are comprised of four partial strands, and the sensor system is comprised of four sensor groups for the independent position evaluation of the rotor and the commutation of the partial strands. Thus the direct-current motor includes four separately switched and controllable electric motor units. In a parallel operation of the motor units, the total output of the motor is the total of the individual outputs of the motor units. Such a direct-current motor requires a relatively large installation space. Upon the failure of a sensor group or of a partial strand of a motor unit, the other three motor units continue to operate due to the separate partial strands with the associated separate sensor groups. This also has the disadvantage that upon the failure of a motor unit the motor power is relatively lower. Alternatively even only one motor unit can be operated alone, wherein an additional control unit would recognize a failure of the currently active motor unit and then would be switched to another motor unit. This would have the disadvantage that additional components would be needed for such a control unit.

The object of the present invention is to provide a redundant brushless drive system which is formed in a particularly simple, light, and compact manner, wherein the properties of the drive system are formed as equally as possible in the event of recoverable failures.

INTRODUCTORY DESCRIPTION OF THE INVENTION

The previously expressed object is inventively achieved in that the coil is constructed as a bifilar, air-gap winding that comprises at least two separately controllable phase windings made from individual wires, and the sensor system comprises at least two sensor groups disposed along the motor axle respectively one-behind-the-other, parallel to each other and respectively symmetrical to the motor axle, and an encoder circuit board is configured such that an association of the sensor groups to a phase winding is configurable such that either the first sensor group can be used for controlling the first phase winding and the second sensor group for controlling the second phase winding, or the first sensor group is used for controlling the second phase winding and the second sensor group for controlling the first phase winding. This makes possible an especially light manner of construction, since due to the air-gap winding an iron core can be omitted, wherein sufficient stability for the coil is simultaneously ensured. Furthermore, a redundant coil is made possible by the bifilar air-gap winding with at least two separately controllable phase windings which needs extremely little installation space. The special arrangement of the sensor groups makes possible a redundant sensor system for the redundant coil which also requires little construction space. Such a construction of a redundant drive system saves additional components, such as, for example, additional bearings or additional components in the coil. It can further be ensured that the motor function can furthermore be fully ensured, and in particular with constant power.

In a preferred embodiment of the invention the windings of the phase windings are wound parallel to each other and adjacent to each other with the same distance to the motor axle and, in particular, from identical individual wires. This makes possible phase windings that have almost identical electrical properties, so that upon a change from one phase winding to another phase winding during operation of the drive system, it has almost identical performance characteristics.

In particular in one embodiment of the inventive drive system the sensor system is disposed in an integrated encoder chip configured as a double encoder. This reduces the installation space for the sensor system and makes possible an especially space-saving and simple arrangement of the sensor groups.

BRIEF DESCRIPTION OF THE DRAWINGS

Further embodiments and advantages of the inventive drive system arise from the following description and drawing Figures descriptions.

In the various Figures, identical parts are always provided with the same reference numbers.

FURTHER DESCRIPTION OF THE INVENTION

In the following description it is claimed that the invention is not limited to the exemplary embodiments and thereby not to all or a plurality of features of the described feature combinations; moreover, each individual partial feature of the/of each exemplary embodiment is also dissociated from all other partial features described in conjunction therewith and also in combination with any desired features of another exemplary embodiment of significance for the object of the invention.

Figure 1:
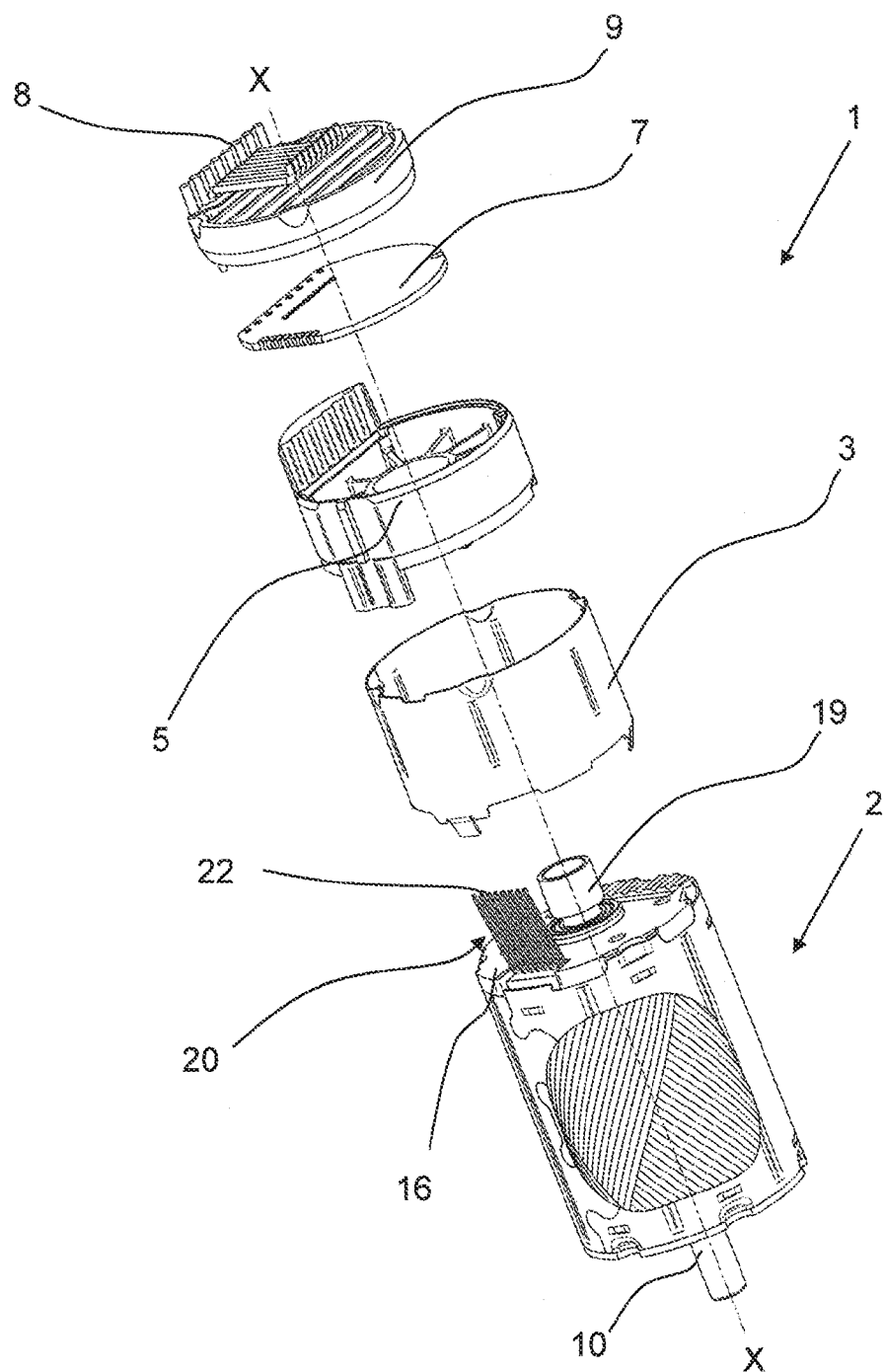
FIG. 1 shows an exploded drawing of an embodiment of an inventive brushless drive system with a partial cut in the region of the coil.
Figure 2:
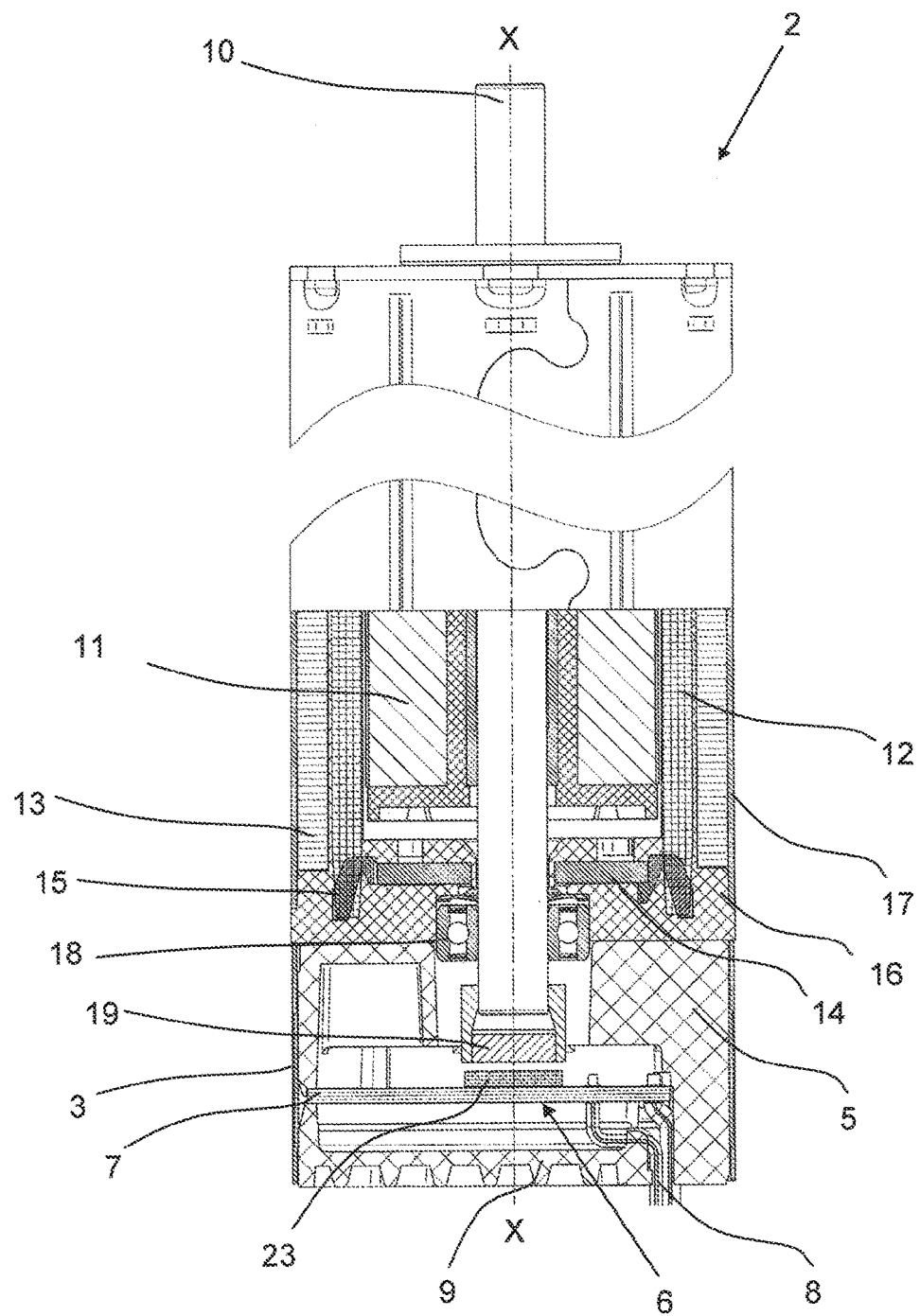
FIG. 2 shows a partial cut of an inventive brushless drive system along the center axis X-X.

A preferred embodiment of an inventive brushless drive system 1 is depicted in FIG. 1 and FIG. 2. The drive system 1 includes in particular a motor unit 2, a housing 3, a flange 5, a sensor system 6, an encoder circuit board 7, drive system connections 8 provide motor connections and encoder connections, and a cover 9.

The motor unit 2 includes in particular a motor axle (shaft) 10, a rotor magnet 11 attached to the motor axle 10, a cylindrical coil 12, an iron counter plate 13 enclosing the coil 12 like a casing, a circuit board 14, a winding aid 15, a cover 16, and a housing casing 17. The cover 16 includes a through-opening through which the motor axle 10 is guided. An axle bearing 18 for supporting the motor axle 10 is disposed on the exterior of the cover 16. The coil 12 and the iron counter plate 13 form the stator of the motor unit 2.

In particular a sensor magnet 19 is disposed on the end side of the motor axle 10 facing the sensor system 6 and fixedly connected to the motor axle 10. In particular the motor unit 2 includes a wire screen 20 (only depicted in FIG. 1) which protrudes on the end side of the motor unit 2 facing the cover 9 from the cover 16 of the motor unit 2 towards the cover 9 and is electrically connected to the sensor system by the flange 5, in particular via the encoder circuit board 7.

The housing casing 17 is depicted partially cut-away in FIG. 1 to highlight the coil 12 of the motor unit 2, in order to be able to depict the windings of the coil 12 of the motor unit 2. The coil 12 is constructed in particular according to EP 1 855 372 B1 as a bell armature coil (see also FIG. 5). The coil 12 includes in particular a self-supporting, cured, air-gap winding 21 without an iron core. The air-gap winding 21 is inventively configured as a bifilar air-gap winding 21 which includes in particular two advantageously symmetrically configured phase windings W1, W2, made from individual wires and controllable separately from each other. The windings of the phase windings W1, W2 are advantageously identically configured and extend parallel to each other and abutting on one another, in particular each having the same distance to the motor axle 10.

Figure 3:
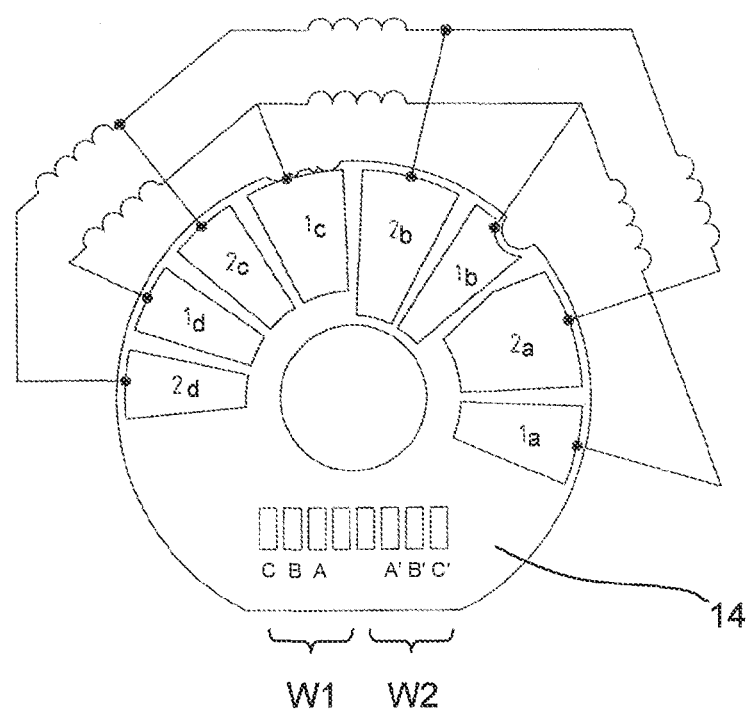
FIG. 3 shows a schematic depiction of the circuit board of the coil of an inventive brushless drive system.
Figure 5:
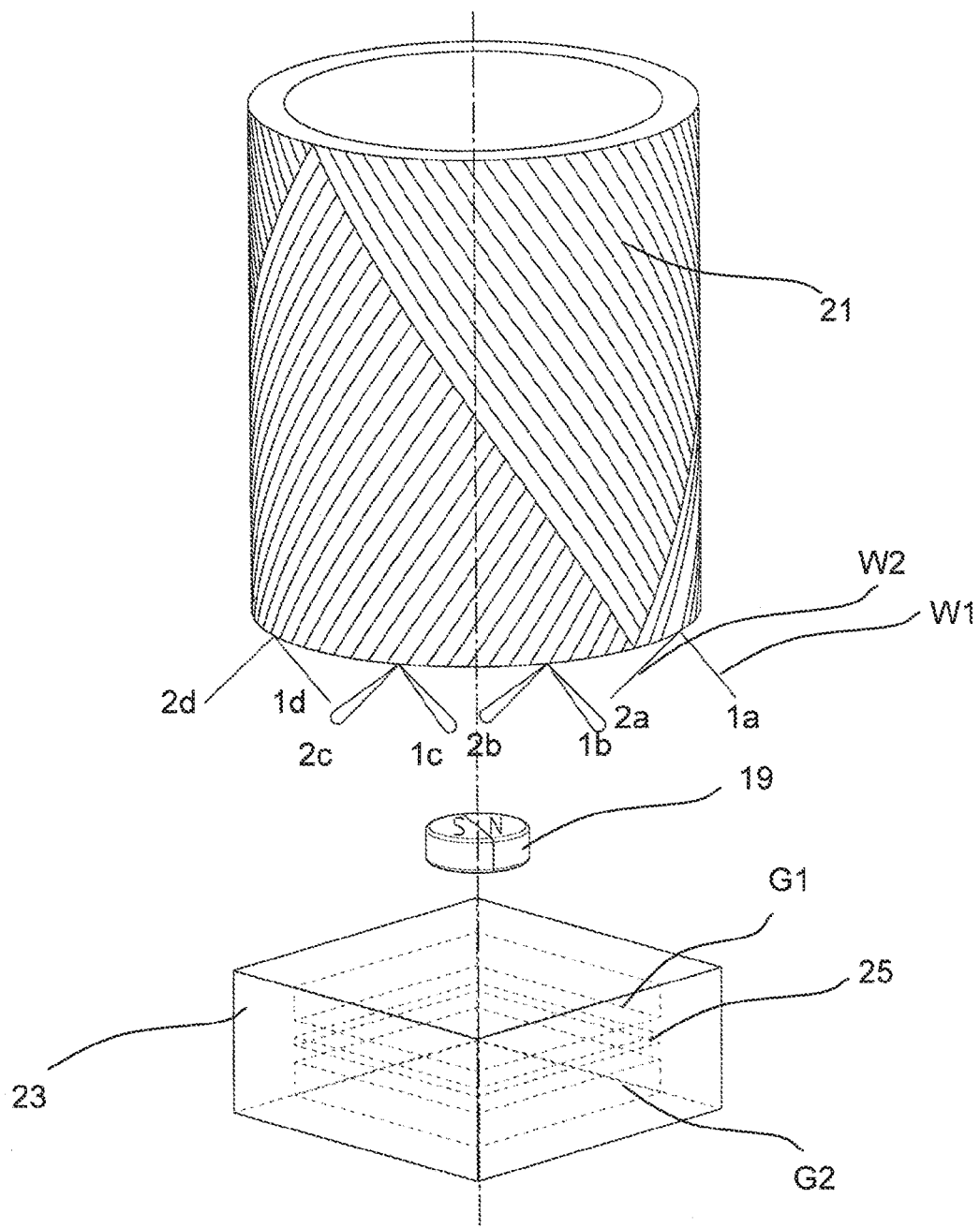
FIG. 5 shows a schematic sketch of the stator windings, of the sensor magnets, and of the encoder chip of an inventive brushless drive system.

The circuit board 14 for the coil 12 is shown in FIG. 3, and in FIG. 5, among other things, the coil 12 including the bifilar air-gap winding 21. Both phase windings W1, W2 of the bifilar air-gap winding 21 include in particular four leed taps, comprised of the respective winding beginnings 1a, 2a, the respective winding loops 1b, 1c, 2b, 2c and the respective winding ends 1d, 2d which divide the respective phase windings W1, W2 into three respective coil segments. According to FIG. 5 the air-gap winding 21 is advantageously configured as an oblique bifilar winding having mutually crossing layers. In FIG. 5 the individual wires of the phase windings W1, W2 are only recognizable at the separate taps 1a, 1b, 1c, 1d, 2a, 2b, 2c, 2d, since the individual wires lie directly adjacent to each other in the winding layers and are depicted in FIG. 5 only as a common line.

According to FIG. 3 the circuit board 14 is connected to the respective taps 1a, 1b, 1c, 1d for the coil segments of the first phase winding W1 and the taps 2a, 2b, 2c, 2d for the coil segments of the second phase winding W2 and includes corresponding contact elements A, B, C for the first phase winding W1 and A', B', C' for the second phase winding W2 for connecting to the wire screen 20. The wire screen 20 defines a plurality of contact pins 22 that engage into contact elements A, B, C, A', B', C' in the motor unit 2 and connect electrically to one another. The wire screen 20 connects the taps 1a, 1b, 1c, 1d of the first phase winding W1 and the taps 2a, 2b, 2c, 2d of the second phase winding W2 of the circuit board 14 using corresponding separate connections for each phase winding W1, W2 on the sensor system 6, in particular on the encoder circuit board 7 (also see FIG. 4). In a not-depicted advantageous embodiment the circuit board 14 can include configuration means, in particular jumper connections, in order to connect together the phase windings W1, W2 into one common, controllable phase winding. As a result the redundancy function of the coil is eliminated, but the power of the motor is increased. Here a redundancy is still present in the sensor system.

Figure 4:
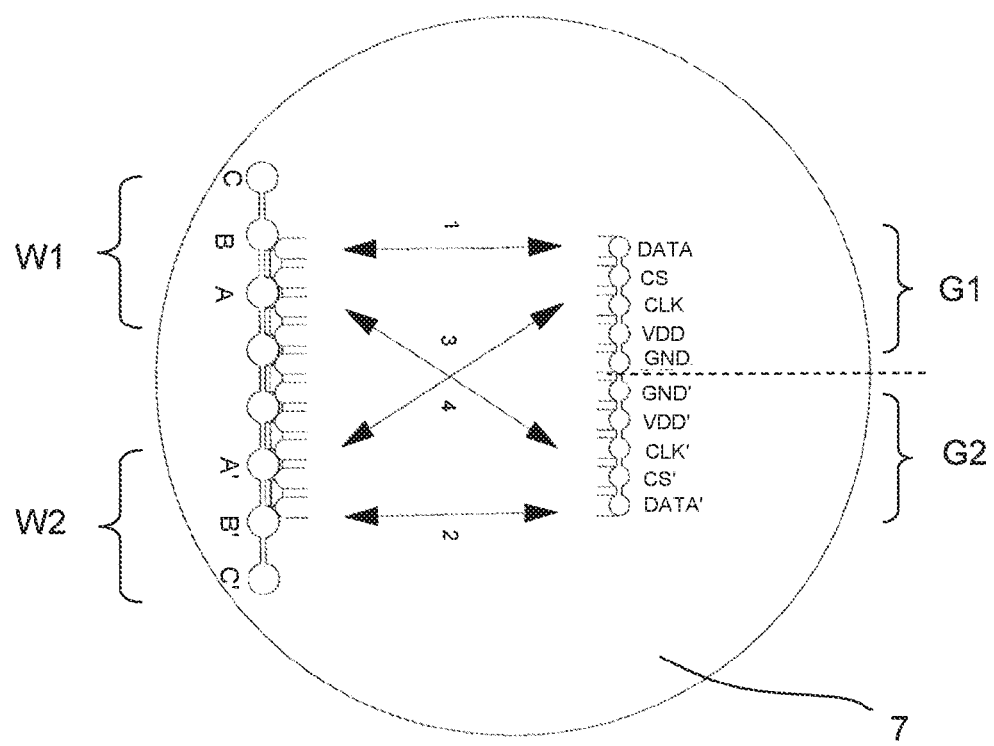
FIG. 4 shows a schematic sketch of encoder circuit board of an inventive brushless drive system.

The encoder circuit board 7 in schematically depicted in FIG. 4. The sensor system 6 in particular is disposed on the encoder circuit board 7. The sensor system 6 is configured in particular as an integrated encoder chip 23 and includes two sensor groups G1, G2 controllable independently from each other (see also FIG. 5). The sensor groups G1, G2 are preferably provided in the form of Hall sensors. Each sensor group G1, G2 is connectable as desired to the taps 1a, 1b, 1c, 1d or 2a, 2b. 2c, 2d of phase windings W1, W2 via configurable connections via the encoder circuit board 7. Thus the sensor system 6 makes possible a configurable association of the sensor groups G1, G2 to a phase winding W1, W2, so that either the first sensor group G1 is used for controlling the first phase winding W1 and the second sensor group G2 for controlling the second phase winding W2, or the first sensor group G1 for controlling the second phase winding W2 and the second sensor group G2 for controlling the first phase winding G1. The configuration can in particular be effected between the phase windings W1, W2 and the sensor groups G1 and G2 by not-depicted jumper connections disposed on the encoder circuit board 7. The encoder circuit board 7 includes electrical connections for all electrical drive system connections 8, in particular for the encoder connections for the two sensor groups G1, G2 and for the motor connections for the phase windings W1, W2. The drive system connections 8 are disposed on the cover 9 and are connectable using a connected cable connection, in particular a ribbon cable.

The sensor system 6, the sensor magnet 19, and the bifilar, iron-free, air-gap winding 21 including the two phase windings W1, W2 are depicted in FIG. 5. The two sensor groups G1, G2 are inventively configured along the motor axle 10, or the center axis X-X of the motor unit 2, one-behind-the-other, parallel to each other and respectively symmetrical to the motor axle 10 or the center axis X-X. Both sensor groups G1, G2 are electrically insulated from each other in an integrated encoder chip 23 by an electrical insulation layer 25. Thus both sensor groups G1, G2 detect the magnetic signals of the sensor magnets 19 independently of each other, simultaneously and in the same manner.

Such a brushless drive system 1 makes an in particular electrically redundant drive system 1. If a pair from one sensor group G1, G2 and a phase winding W1, W2 fail because of a defect of a phase winding W1, W2 or a sensor group G1, G2, then the other pair of a sensor group G1, G2 and a phase winding W1, W2 can further ensure the error-free function of the direct current motor 1. Even if one sensor group G1, G2 of the one pair and a phase winding W1, W2 of the other pair fails, the still-functioning sensor group G1, G2 can be associated with the still-functioning phase winding W1, W2 as a new pair by a reconfiguration of the association of the pairs, so that the motor function can still be ensured in full and in particular with constant output.

In addition, the bifilar air-gap winding 21 makes possible with the special design of the phase windings W1, W2 a particularly compact configuration of the redundant drive system 1. The integrated encoder chip 23 configured as a double encoder further improves the compact configuration.

As a result of the two phase windings W1, W2 being configured almost identically and the windings being wound in particular parallel to each other and adjacent to each other with the same distance to the motor axle 10, the characteristics of the motor, and in particular the power, remain almost unchanged even with the failure of a phase winding W1, W2 and/or a sensor group G1, G2.

The invention is not limited to the depicted and described exemplary embodiments, but also comprises all embodiments functioning the same way in the sense of the invention. It is expressly emphasized that the exemplary embodiments are not limited to all features in combination;

While the above description constitutes the preferred embodiment of the present invention, it will be appreciated that the invention is susceptible to modification, variation and change without departing from the proper scope and fair meaning of the accompanying claims.

The invention claimed is:

1. A redundant brushless drive system, comprising:
a coil including at least a first and a second phase winding operable independently of one another and a sensor system including at least independently operable first and second sensor groups for capturing the rotational position of a rotor and for commutation of the first and second phase windings,
the first and the second phase windings made from individual wires, and the first and second sensor groups disposed along a motor axle respectively one-behind-the-other and parallel to each other and symmetrical to the motor axle, an encoder circuit board is configured such that an association of the first and second sensor groups to the first and second phase windings is configurable so that either the first sensor group is used for controlling the first phase winding and the second sensor group is used for controlling the second phase winding, or the first sensor group is used for controlling the second phase winding and the second sensor group is used for controlling the first phase winding.

2. A redundant brushless drive system according to claim 1, further comprising the first and the second phase winding are wound from identical individual wires.

3. A redundant brushless drive system according to claim 1 further comprising the first and second phase windings are wound parallel to each other and adjacent to each other with the same distance to the motor axle.

4. A redundant brushless drive system according to claim 1 further comprising one of the first and the second phase winding is connected with either of the first and the second sensor groups.

5. A redundant brushless drive system according to claim 1 further comprising the sensor system is disposed in an integrated encoder chip configured as a double encoder.

6. A redundant brushless drive system according to claim 1 further comprising a sensor magnet connected to the motor axle is positioned on the end side of the motor axle facing the first and the second sensor groups.

7. A redundant brushless drive system according to claim 1 further comprising a circuit board includes configuration means for connecting the first and second phase windings together into a common, controllable phase winding.

8. A redundant brushless drive system according to claim 1 further comprising wherein the circuit board is configured to provide both a first and a second configuration wherein in the first configuration the first sensor group is used for controlling of the first phase winding and the second sensor group is used for controlling the second phase winding, and in the second configuration the first sensor group is used for controlling the second phase winding and the second sensor group is used for controlling the first phase winding.

9. A redundant brushless drive system according to claim 8 further comprising the circuit board is configured to provide the first or the second configuration and upon failure of one or more of the first and the second phase windings or the first or the second sensor groups, the other of the first or the second configurations is provided.

* * * * *